US011845294B2

(12) United States Patent
Wong et al.

(10) Patent No.: US 11,845,294 B2
(45) Date of Patent: Dec. 19, 2023

(54) KEYBOARD WITH RECYCLED AND BIODEGRADABLE COMPOSITE MATERIAL FOR AN INFORMATION HANDLING SYSTEM

(71) Applicant: Dell Products L.P., Round Rock, TX (US)

(72) Inventors: Hin Loong Wong, Singapore (SG); Xin Hua Tian, Shanghai (CN); Peng Lip Goh, Singapore (SG); Deeder M. Aurongzeb, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 173 days.

(21) Appl. No.: 17/471,430

(22) Filed: Sep. 10, 2021

(65) Prior Publication Data

US 2023/0082334 A1  Mar. 16, 2023

(51) Int. Cl.
*B41J 5/10* (2006.01)
*G06F 3/02* (2006.01)
*C08L 67/04* (2006.01)
*C08K 3/11* (2018.01)
*C08L 101/00* (2006.01)
*C08K 3/105* (2018.01)

(52) U.S. Cl.
CPC ............... *B41J 5/105* (2013.01); *C08K 3/105* (2018.01); *C08K 3/11* (2018.01); *C08L 67/04* (2013.01); *C08L 101/00* (2013.01); *G06F 3/0202* (2013.01); *C08L 2201/06* (2013.01)

(58) Field of Classification Search
CPC ...................................................... C08L 67/04
See application file for complete search history.

(56) References Cited

U.S. PATENT DOCUMENTS

| 6,264,385 | B1 * | 7/2001 | Ito | H01H 13/70 400/472 |
| 6,512,174 | B2 * | 1/2003 | Mori | H05K 5/00 361/757 |
| 8,811,003 | B1 * | 8/2014 | Hayashida | G06F 1/1662 361/679.08 |
| 9,994,703 | B2 * | 6/2018 | Bay | C08L 47/00 |
| 10,042,395 | B2 * | 8/2018 | Sim | B29C 70/0035 |
| 2002/0033761 | A1 * | 3/2002 | Katakami | H01H 13/86 361/679.13 |

(Continued)

FOREIGN PATENT DOCUMENTS

JP  0946056 A  *  2/1997

OTHER PUBLICATIONS

Fong et al. (J. Polym. Mater. Vol. 29, No. 3, 2012, 437-449) (Year: 2012).*

*Primary Examiner* — Liam J Heincer
(74) *Attorney, Agent, or Firm* — Norton Rose Fulbright US LLP (57) ABSTRACT

Disclosed is a keyboard for an information handling system. The keyboard includes a top cover comprising a polyester and a plurality of jute fibers, a keycap assembly comprising one or more keycaps, and a bottom cover comprising a first polylactic acid (PLA) and a post-consumer resin (PCR). The keycap assembly can be positioned between the top cover and the bottom cover, and the top cover can include one or more openings keycap assembly keycaps to protrude through.

18 Claims, 5 Drawing Sheets

(56) References Cited

U.S. PATENT DOCUMENTS

2014/0198437 A1\* 7/2014 Busby .................. B32B 7/12
  144/333
2022/0130626 A1\* 4/2022 Abbatiello ............ C08G 64/06
2023/0011372 A1\* 1/2023 Chen ................. G06F 3/03547

\* cited by examiner

KEYBOARD WITH RECYCLED AND BIODEGRADABLE COMPOSITE MATERIAL FOR AN INFORMATION HANDLING SYSTEM

BACKGROUND

A. Field of the Disclosure

The disclosure generally relates to a keyboard for an information handling system. In certain embodiments, the disclosure relates to a keyboard for an electronic device, said keyboard having recycled content.

B. Description of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

The increase in the number of information handling systems used by consumers, and the pace at which new models are introduced creates a situation where many consumers replace electronic device components on a frequent basis. Many of these components are discarded as waste, end up in landfills, and remain buried in our planet for hundreds of years, if not longer.

BRIEF SUMMARY

A sustainably-sourced and environmentally-friendly keyboard that exhibits high strength and durability may reduce some of the waste product left behind by information handling systems after they reach end-of-life. The keyboard can include recycled, recyclable, and/or biodegradable plastics, adhesives, and metallic components that provide a reduced environmental footprint, as compared to traditional keyboards. The keyboard's recycled, recyclable, and/or biodegradable components are assembled and arranged to provide strength and durability that is equal to or greater than traditional keyboards.

Some aspects of the disclosure are directed to a keyboard for an information handling system. The covering can include a top cover, a keycap assembly, and a bottom cover. In some aspects, the keycap assembly includes one or more keycaps and is positioned between the top cover and the bottom cover. The top cover can comprise one or more openings, with the one or more keycaps of the keycap assembly protruding though the one or more openings of the top cover. In some aspects, the top cover and bottom cover are physically attached to each other. The top cover and bottom cover can be attached to each other through various fastening means, including ultrasonic welding, screws, clips, through the use of one or more adhesives, or any combination of the foregoing. When the top cover and bottom cover are attached to each other through the use of one or more adhesives, the one or more adhesives may be a recyclable adhesive, a biodegradable adhesive, or a combination thereof. In some aspects, the one or more adhesives are selected from polyvinyl acetate, a combination of styrene monomer and methyl ethyl ketone peroxide, or a combination of these adhesives.

The top cover can include renewable and or recycled content. In some aspects, the top cover can include from 10 wt. % to 80 wt. % renewable content. In some aspects the top cover can optionally include up to 70 wt. % recycled content. The top cover can include a polyester and a plurality of jute fibers. In some aspects, the top cover can be a first laminate that includes a first layer and a second layer. In some aspects, the first laminate first layer comprises a polyester. In some aspects, the first laminate first layer can include virgin polyester material and post-consumer resin (PCR). In some aspects, the first laminate first layer can include from 30 wt. % to 100 wt. % virgin polyester material. The first laminate first layer can include 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. % of virgin polyester material. In some aspects, the top cover first laminate first layer can optionally include up to 70 wt. % PCR. The top cover first laminate first layer can include 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, or 70 wt. % PCR, or any value therein. In some aspects, the first laminate first layer can include from 30 wt. % to 99 wt. % virgin polyester material and from 1 wt. % to 70 wt. % PCR. In some aspects, the top cover has a thickness ranging from 1.8 mm to 5 mm. In some aspects, the top cover thickness can be 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0 mm, or any value therein. In some aspects, the first laminate first layer has a thickness ranging from 0.8 mm to 2.0 mm. The first laminate first layer can have a thickness of 0.8, 0.9, 1.0, 1.1, 1.2, 1.3, 1.4, 1.5, 1.6, 1.7, 1.8, 1.9, 2.0 mm, or any value therein. In some aspects, the first laminate second layer has a thickness ranging from 1.0 to 3.0 mm. The first laminate second layer can have a thickness of 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0 mm, or any value therein. In some aspects, the polyester is a second polylactic acid (PLA, i.e. the PLA in the top cover may be different from or the same as the PLA in the bottom cover). In some aspects, the first laminate first layer can be made from a manufacturing process selected from the group consisting of plastic injection, rotational (roto) molding, extrusion blow molding, injection blow molding, reaction injection molding (RIM), vacuum casting, thermoforming and compression molding.

In some aspects, the first laminate second layer comprises a plurality of jute fibers. In some aspects, the plurality of jute fibers of the first laminate second layer can be provided in the form of a fabric layer. In some aspects, the plurality of jute fibers comprises cellulose, hemicellulose, pectin, lignin, or a combination thereof. In specific aspects, the plurality of jute fibers comprise from 60 wt. % to 70 wt. % cellulose, from 14 wt. % to 20 wt. % hemicellulose, about 0.2 wt. % pectin, about 12 wt. % lignin, a moisture content of 11 wt. %, and about 0.5 wt. % wax.

In some aspects, the top cover has a tensile modulus greater than 4,000 Mpa, measured in accordance with ASTM D638. In some aspects, the top cover has a tensile strength greater than 80 Mpa, measured in accordance with ASTM D638. In some aspects, the top cover has a flexural modulus greater than 5,000 Mpa, measured in accordance with ASTM D790A. In some aspects, the top cover has a flexural strength greater than 110 Mpa, measured in accordance with ASTM D790A. In some aspects, the top cover has a compressive strength greater than 17400 psi, measured in accordance with ASTM D695.

In some aspects, the bottom cover comprises a molded composition comprising a first PLA (i.e. the PLA in the bottom cover may be different from or the same as the PLA in the top cover) and post-consumer resin (PCR). In some aspects, the PLA and PCR are molded together. In some aspects, the PLA and PCR constitute a third layer, and the bottom cover further comprises a fourth layer comprising a plurality of jute fibers. In some aspects, the layer of jute fibers is attached to the PLA/PCR layer by the use of an adhesive. The adhesive connecting the third PLA/PCR layer and the fourth jute fiber layer can be a second recyclable or biodegradable adhesive. In some aspects, the bottom cover comprises from 10 wt. % to 60 wt. % of the first PLA, from 10 wt. % to 20 wt. % of the PCR, and a balance of jute fibers. In some aspects, the PCR comprises polyethylene terephthalate (PET), polybutylene terephthalate (PBT), high-impact polystyrene (HIPS), acrylonitrile butadiene styrene (ABS), polycarbonate (PC), or any combination of the foregoing. In some aspects, the first PLA has a density ranging from 1.1 to 1.4 g/cm$^3$. In some aspects, the first PLA has a melt flow index ranging from 20 to 25 g/10 min, measured in accordance with ISO 1133-A at 210° C. In some aspects, the first PLA has a melt flow index ranging from 8 to 12 g/10 min, measured in accordance with ISO 1133-A at 190° C. In some aspects, the first PLA has a stereochemical purity of greater than 99%. In some aspects, the first PLA has a water content of less than or equal to 400 ppm. In some aspects, the first PLA has a melting temperature ranging from 165° C. to 185° C. In some aspects, the first PLA has a glass transition temperature ranging from 55° C. to 65° C.

Some aspects of the disclosure are directed to a keyboard for an information handling system comprising a top cover comprising a polyester and a plurality of jute fibers, a keycap assembly comprising one or more keycaps, a bottom cover comprising a metallic composition comprising at least one of magnesium (Mg), aluminum (Al), and steel. In some aspects, the metallic composition comprises from 80 wt. % to 90 wt. % of magnesium, from 5 wt. % to 10 wt. % of aluminum, and from 5 wt. % to 10 wt. % of steel. In some aspects, at least a portion of the magnesium in the bottom cover comprises recycled magnesium. The amount of recycled magnesium in the bottom cover may constitute 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. % of the total magnesium in the bottom cover. In some aspects, at least a portion of the aluminum in the bottom cover comprises recycled aluminum. The amount of recycled aluminum in the bottom cover may constitute 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. % of the total aluminum in the bottom cover. In some aspects, at least a portion of the steel in the bottom cover comprises recycled steel. The amount of recycled steel in the bottom cover may constitute 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, or 100 wt. % of the total steel in the bottom cover. In some aspects, the bottom cover is formed by a die cast method. In some aspects, the bottom cover has a thickness ranging from 1.5 mm to 2.5 mm. In some aspects, the bottom cover has a tensile modulus greater than 30,000 Mpa, measured in accordance with ASTM D638. In some aspects, the bottom cover has a tensile strength greater than 160 Mpa, measured in accordance with ASTM D638. In some aspects, the bottom cover has a flexural modulus greater than 10,000 Mpa, measured in accordance with ASTM D790A. In some aspects, the bottom cover has a flexural strength greater than 50 Mpa, measured in accordance with ASTM D790A. In some aspects, the bottom cover further comprises a battery compartment. In some embodiments, the bottom cover has recycled metal content of at least 80% and up to 100% of the magnesium when the bottom cover comprises magnesium, of between 5-10% of the aluminum or more when the bottom cover comprises aluminum, or of between 5-10% of the steel or more when the bottom cover comprises steel.

The following includes definitions of various terms and phrases used throughout this specification.

As used herein recycle content of a material refers to wt. % of the material obtained from, made from and/or recovered from waste. Unless mentioned otherwise the waste can be post-industrial and post-consumer waste. Post-consumer waste of a material is a waste generated by a customer of a substrate containing the material. Post-industrial waste is waste generated during a production process of a product and has not used in the consumer market.

As used herein renewable content of a material refers to wt. % of the material obtained from or made from a bio-based renewable material. Unless mentioned otherwise, bio-based material can include materials from any life form such as plants, animals, fungi, protists, prokaryotes, microbes, algae, bacteria, yeasts and/or molds. The bio-based material can be obtained from natural or genetically engineered species.

A recyclable adhesive is an adhesive that can be fully melted down without yielding any adhesive waste or residue when the end use product has reached its end of life. A biodegradable adhesive is an adhesive that can be broken down by bacteria and other living organisms. A compostable adhesive is a sub-set of biodegradable adhesives. Compostable adhesives are broken down in a compost pile environment and leave no harmful residue or waste behind once fully composted.

As used herein total recycled and renewable content of a material refers to wt. % of the material obtained from, made from and/or recovered from waste and wt. % of the material obtained from or made from a bio-based renewable material. For example, for a 100 gm material is 10 gm is obtained recycled sourced and 10 gm is obtained from renewable source, the total recycled and renewable content of the material is 20 wt. %.

The terms "about" or "approximately" are defined as being close to as understood by one of ordinary skill in the art. In one non-limiting embodiment, the terms are defined to be within 10%, preferably within 5%, more preferably within 1%, and most preferably within 0.5%.

The terms "wt. %," "vol. %," or "mol. %" refers to a weight percentage of a component, a volume percentage of a component, or molar percentage of a component, respectively, based on the total weight, the total volume of material, or total moles, that includes the component. In a non-limiting example, 10 grams of component in 100 grams of the material is 10 wt. % of component. The term "ppm" refer to parts per million by weight, based on the total weight, of material that includes the component.

The term "substantially" and its variations are defined to include ranges within 10%, within 5%, within 1%, or within 0.5%.

The terms "inhibiting" or "reducing" or "preventing" or "avoiding" or any variation of these terms, when used in the claims and/or the specification includes any measurable decrease or complete inhibition to achieve a desired result.

The term "effective," as that term is used in the specification and/or claims, means adequate to accomplish a desired, expected, or intended result.

The use of the words "a" or "an" when used in conjunction with any of the terms "comprising," "including," "containing," or "having" in the claims, or the specification, may mean "one," but it is also consistent with the meaning of "one or more," "at least one," and "one or more than one."

The phrase "and/or" means and or. To illustrate, A, B, and/or C includes: A alone, B alone, C alone, a combination of A and B, a combination of A and C, a combination of B and C, or a combination of A, B, and C. In other words, "and/or" operates as an inclusive or.

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The keyboard of the present disclosure can "comprise," "consist(s) essentially of," or "consist of" particular ingredients, components, compositions, etc. disclosed throughout the specification. In one aspect of the present disclosure, and with reference to the transitional phrase "consist(s) essentially of" or "consisting essentially of," a basic and novel characteristic of the present disclosure can include keyboard containing a) a top cover comprising a polyester and a plurality of jute fibers, b) a keycap assembly comprising one or more keycaps, and c) a bottom cover comprising a first polylactic acid (PLA) and a post-consumer resin (PCR).

Other objects, features and advantages of the present disclosure will become apparent from the following detailed description and examples. It should be understood, however, that the detailed description and examples, while indicating specific embodiments of the disclosure, are given by way of illustration only and are not meant to be limiting. Additionally, it is contemplated that changes and modifications within the spirit and scope of the disclosure will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present disclosure may become apparent to those skilled in the art with the benefit of the following detailed description and upon reference to the accompanying drawings. While the disclosure is susceptible to various modifications and alternative forms, specific embodiments thereof are shown by way of example in the drawings. The drawings may not be to scale.

DETAILED DESCRIPTION

The present inventors have discovered that a keyboard having enhanced stiffness can be produced using a specific set of materials in a specific order. The keyboard exhibits high strength and durability, and provides an environmentally-friendly approach for reducing plastic pollution, as it includes a significant amount of recycled, recyclable, and/or biodegradable material. In one aspect, the discovery includes keyboard for an information handling system that includes a top cover comprising a polyester and a plurality of jute fibers, a keycap assembly comprising one or more keycaps, and a bottom cover comprising polylactic acid (PLA) and post-consumer resin (PCR). Alternatively, the keyboard can include a metallic bottom cover that includes recycled metal and/or alloy content.

These and other non-limiting aspects of the present disclosure are discussed in further detail in the following sections.

Figure 1:
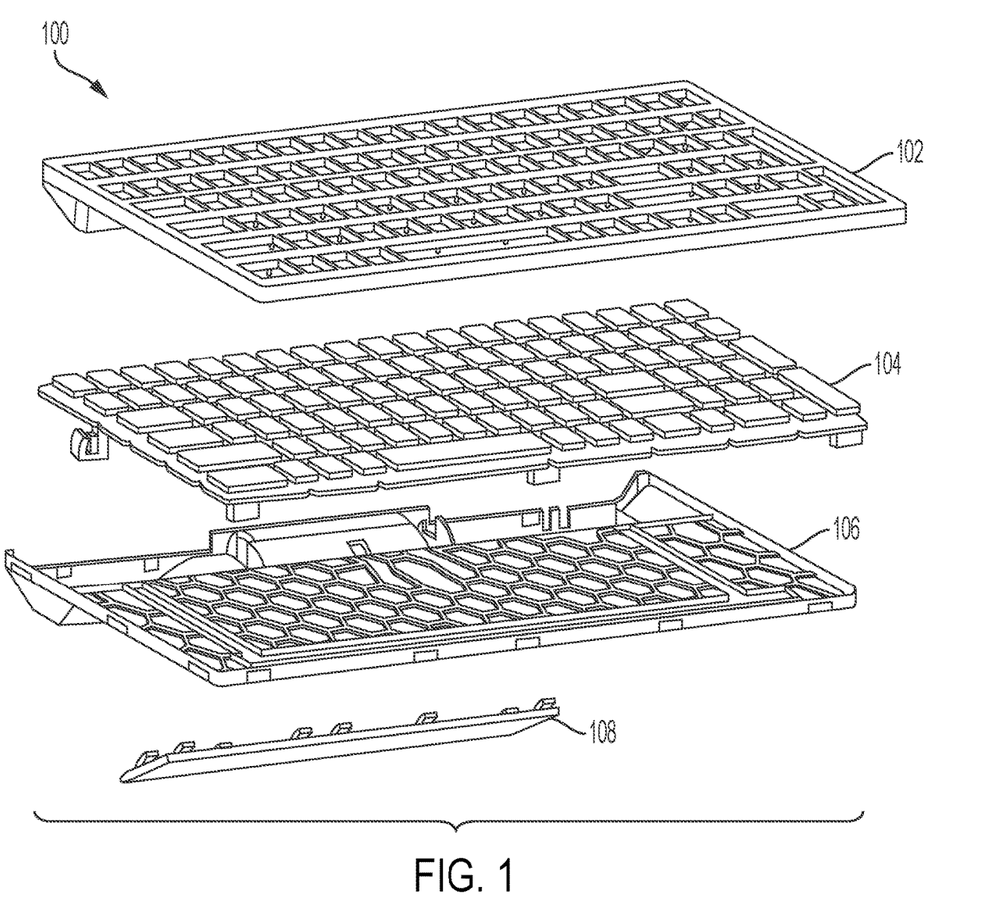
FIG. 1: Schematic of a keyboard according to an example of the present disclosure.
Figure 2:
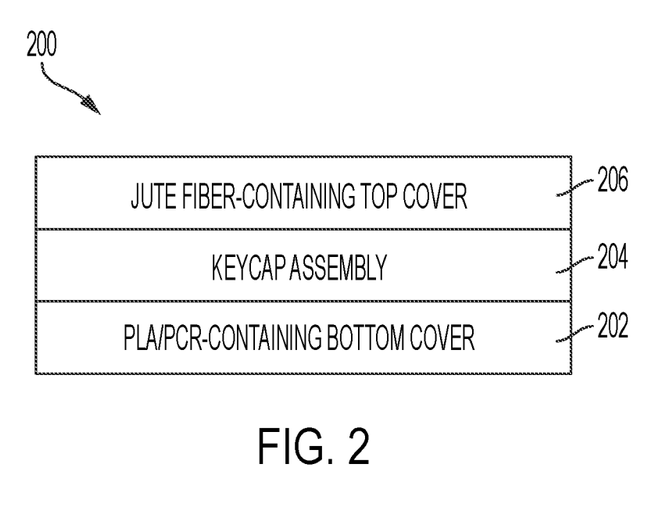
FIG. 2: Schematic depicting the layer arrangement of a keyboard according to an example of the present disclosure.
Figure 3:
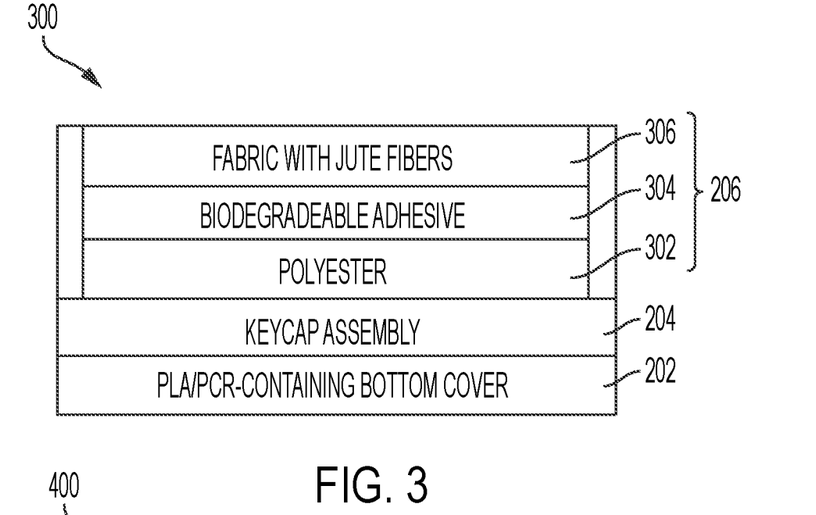
FIG. 3: Schematic of a keyboard according to an example of the present disclosure.

Referring to FIG. 1, an exploded view of a keyboard 100 according to one example of the present disclosure is shown. The keyboard 100 employs recycled, recyclable, and/or biodegradable material in order to reduce the plastic waste burden. The keyboard 100 includes top cover 102, keycap assembly 104, bottom cover, 106, and battery cover 108. The keycap assembly 104 is positioned between the top cover 102 and the bottom cover 106, and keycaps in the keycap assembly 104 protrude though the openings of the top cover 102 when the keyboard 100 is assembled. The top cover 102 and bottom cover 106 can be physically attached to each other, for example, through ultrasonic welding. FIG. 2 illustrates materials for the components 102, 104, and 106 as blocks 206, 204, and 202, respectively, according to some embodiments. FIG. 3 illustrates another arrangement of materials for the components 102, 104, and 106, in which the top cover 102 is a jute fiber-containing top cover 206 with multiple layers including a polyester layer 302 and a biodegradable adhesive 304 coupling the polyester layer 302 to the fabric with jute fibers 306.

The top cover 102 can be provided in the form of a first laminate that includes a first layer and a second layer. Providing the top cover in the form of a bi-layer laminate can confer strength and rigidity to the cover. In some aspects, the first laminate first layer is made of a polyester, e.g., polylactic acid, and the first laminate second layer is made of a plurality of jute fibers. Recyclable or biodegradable adhesives can be used to join the first laminate first and second layers. The first laminate first layer can virgin polyester material, and at least a portion of the virgin polyester material can be replaced by up to 70% by weight of post-consumer resin. In some aspects, the top cover has a thickness ranging from 1.8 mm to 5.0 mm. The first laminate first layer can have a thickness ranging from 0.8 mm to 2.0 mm, and the top cover first laminate second layer can have a thickness ranging from 1.0 mm to 3.0 mm. The plurality of the jute fibers can include or be made of cellulose, hemicellulose, pectin, lignin, or any combination of these materials. In some aspects, the top cover can have a renewable content ranging from 10 wt. % to 80 wt. %, and/or recycled content ranging from 10 wt. % to 70 wt. %. Providing the top cover in laminate form has a positive effect on structural rigidity of the cover. For example, when using the materials and the laminate arrangement described above, the top cover can have a tensile modulus greater than 4,000 Mpa, measured in accordance with ASTM D638. In some aspects, the top cover has a tensile strength greater than 80 MPa, measured in accordance with ASTM D638. In some aspects, the top cover has a flexural modulus greater than 5,000 Mpa, measured in accordance with ASTM D790A. In some aspects, the top cover has a flexural strength greater than 110 Mpa, measured in accordance with ASTM D790A. In some aspects, the top cover has a compressive strength greater than 17,400 psi, measured in accordance with ASTM D695.

In some aspects, the bottom cover can be provided in the form of a second laminate that includes a third layer and a fourth layer. Similar to the arrangement of the top cover, providing the bottom cover in the form of a bi-layer laminate bestows strength and rigidity to the cover, and provides a means by which different recycled, recyclable, and/or biodegradable material can be incorporated into the bottom cover. In some aspects, the third layer is a composite layer made of a polylactic acid and post-consumer resin. In some aspects, the fourth layer comprises a plurality of jute fibers. The third and fourth layers can be physically attached to each other, for example, through the use of a second recyclable or biodegradable adhesive. In some aspects, the bottom cover can include 60 wt. % to 10 wt. % of polylactic acid, 10 wt. % to 20 wt. % of post-consumer resin, with a balance wt. of a plurality of jute fibers.

In some aspects, the bottom cover can be provided in metallic form, where at least a portion of metals and/or alloys in the bottom cover can be recycled. In some aspects, the bottom cover can include magnesium, aluminum, and/or steel in any ratio. In certain aspects, the bottom cover is made of a metallic composition comprising 80 wt. % to 90 wt. % of magnesium, 5 wt. % to 10 wt. % of aluminum and 5 wt. % to 10 wt. % of steel. In some aspects, the magnesium in the bottom cover comprises at least a portion of recycled magnesium equal to or greater than 80% of magnesium in the bottom cover. In some aspects, the aluminum in the bottom cover comprises at least a portion of recycled aluminum equal to or greater than 80% of aluminum in the bottom cover. In some aspects, the steel in the bottom cover comprises at least a portion of recycled steel equal to or greater than 80% of steel in the bottom cover. When using the metallic composition described above, the bottom cover can have a tensile modulus greater than 30,000 Mpa, measured in accordance with ASTM D638. In some aspects, the bottom cover has a tensile strength greater than 160 Mpa, measured in accordance with ASTM D638. In some aspects, the bottom cover has a flexural modulus greater than 10,000 Mpa, measured in accordance with ASTM D790A. In some aspects, the bottom cover has a flexural strength greater than 50 Mpa, measured in accordance with ASTM D790A.

Figure 4:
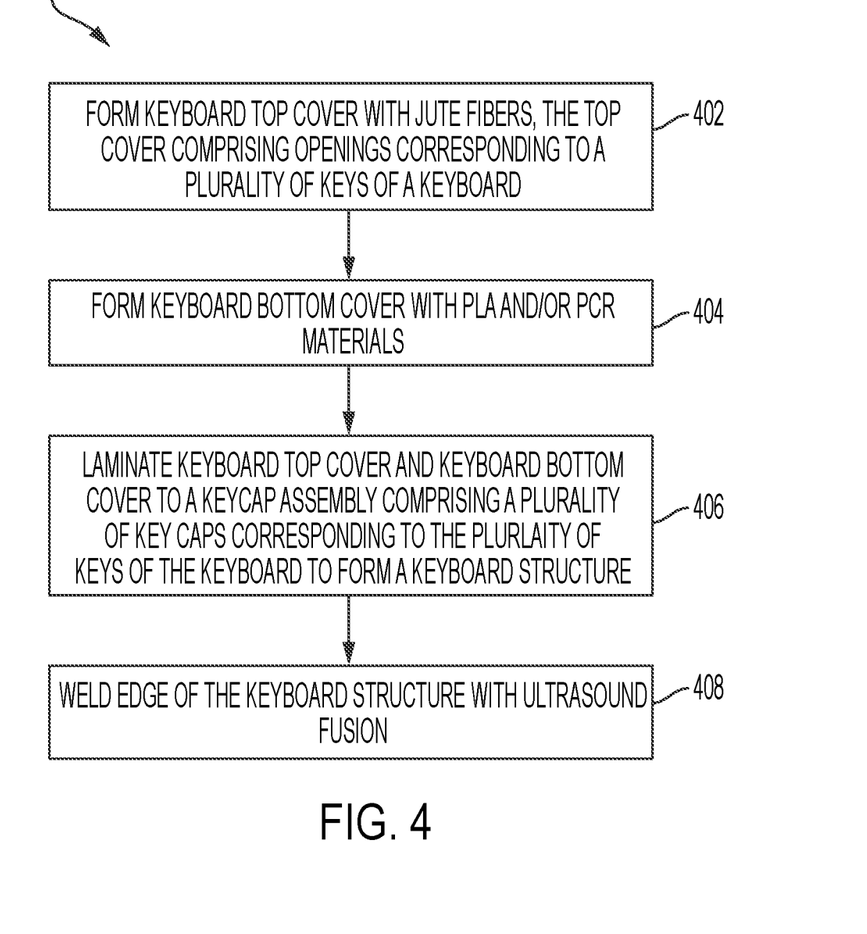
FIG. 4: Schematic of process steps employed for assembling a keyboard for an information handling system according to an example of the present disclosure.

Referring to FIG. 4, a keyboard for an information handling system according to an example of the present disclosure can be assembled by forming, at block 402, a keyboard top cover that includes openings corresponding to a plurality of keys on a keyboard, forming, at block 404, a keyboard bottom cover of polylactic acid and/or post-consumer resin materials, laminating, at block 406, the top and bottom covers to enclose a keycap assembly between the top and bottom covers, and welding, at block 408, the edges of the keyboard structure using an ultrasound fusion technique.

Figure 5:
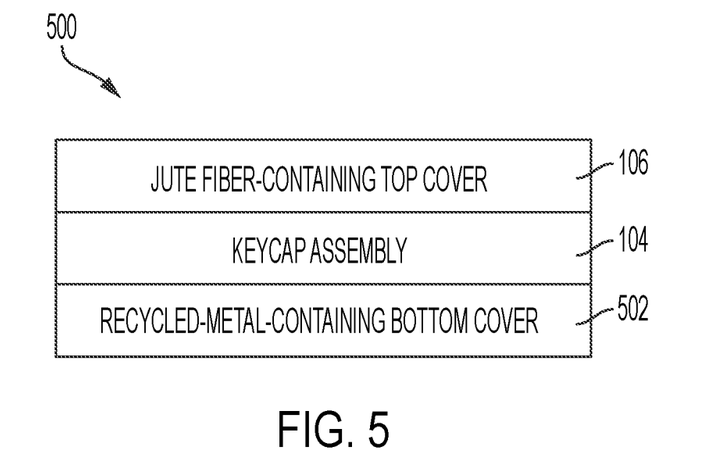
FIG. 5: Schematic of a keyboard according to an example of the present disclosure.

The bottom cover of the keyboard in some embodiments may comprise a recycled metal with or without PLA and/or PCR materials. FIG. 5 illustrates one combination of materials for a keyboard assembly according to some embodiments of the disclosure having a recycled-metal-containing bottom cover. Layers 502, 104, and 106 for a keyboard assembly 500 may include a recycled-metal-containing bottom cover 502 along with the keycap assembly 104 and the Jute fiber-containing top cover 106.

Figure 6:
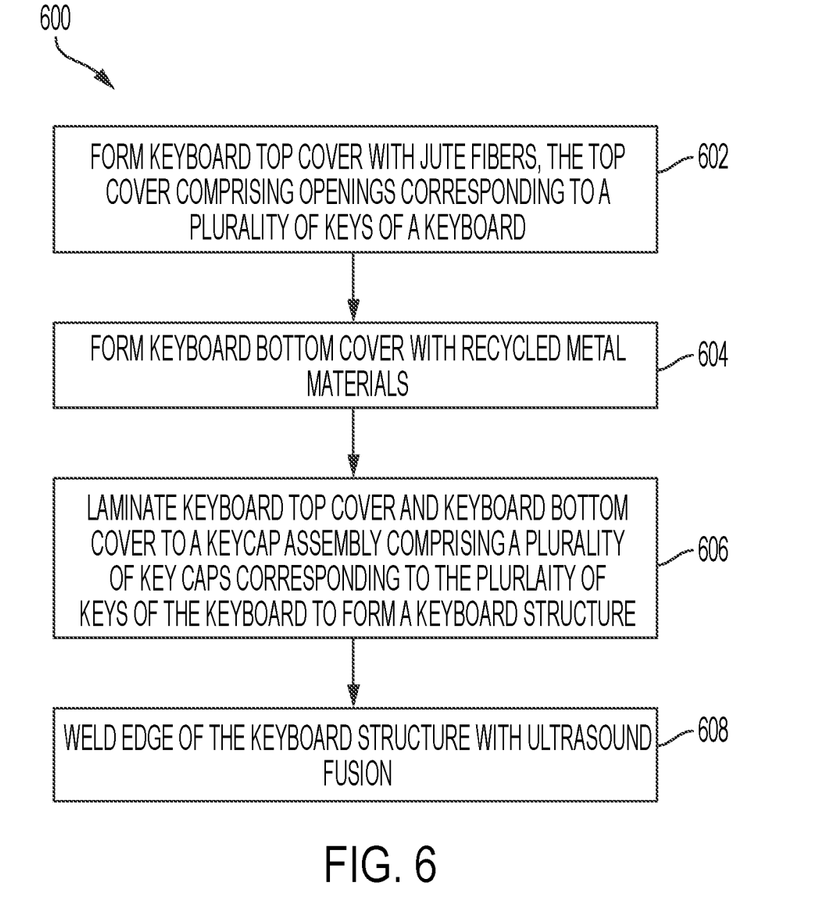
FIG. 6: Schematic of process steps employed for assembling a keyboard having a metal bottom made of recycled materials.

Referring to FIG. 6, a metallic-base keyboard for an information handling system according to an example of the present disclosure can be assembled by forming, at block 602, a keyboard top cover that includes openings corresponding to a plurality of keys on a keyboard, forming, at block 604, a keyboard bottom cover of recycled metal materials, laminating, at block 606, the top and bottom covers to enclose a keycap assembly between the top and bottom covers, and welding, at block 608, the edges of the keyboard structure using an ultrasound fusion technique.

Figure 7:
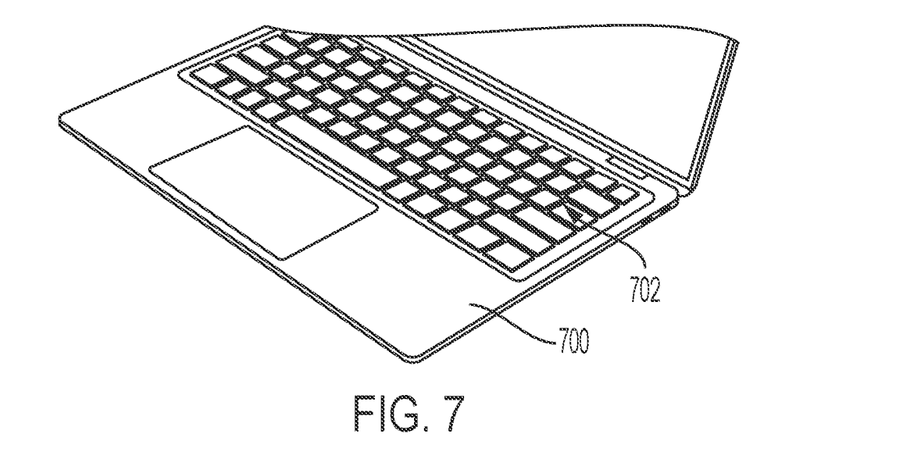
FIG. 7: Schematic of a laptop keyboard according to an example of the present disclosure.

FIG. 7 is a schematic of one embodiment of an information handling system that can incorporate a keyboard assembly as described in various embodiments disclosed herein. An information handling system 700, such as a laptop, may include a keyboard 702 within a "clamshell" laptop, in which the keyboard 702 is accessible by a user for providing input to the information handling system. The keyboard 702 may be a keyboard assembly according to any of the embodiments described herein, including the configurations of FIG. 2, FIG. 3, and FIG. 5. The keyboard 702 may be coupled to provide user input to an information handling system, such as that illustrated in FIG. 8.

Figure 8:
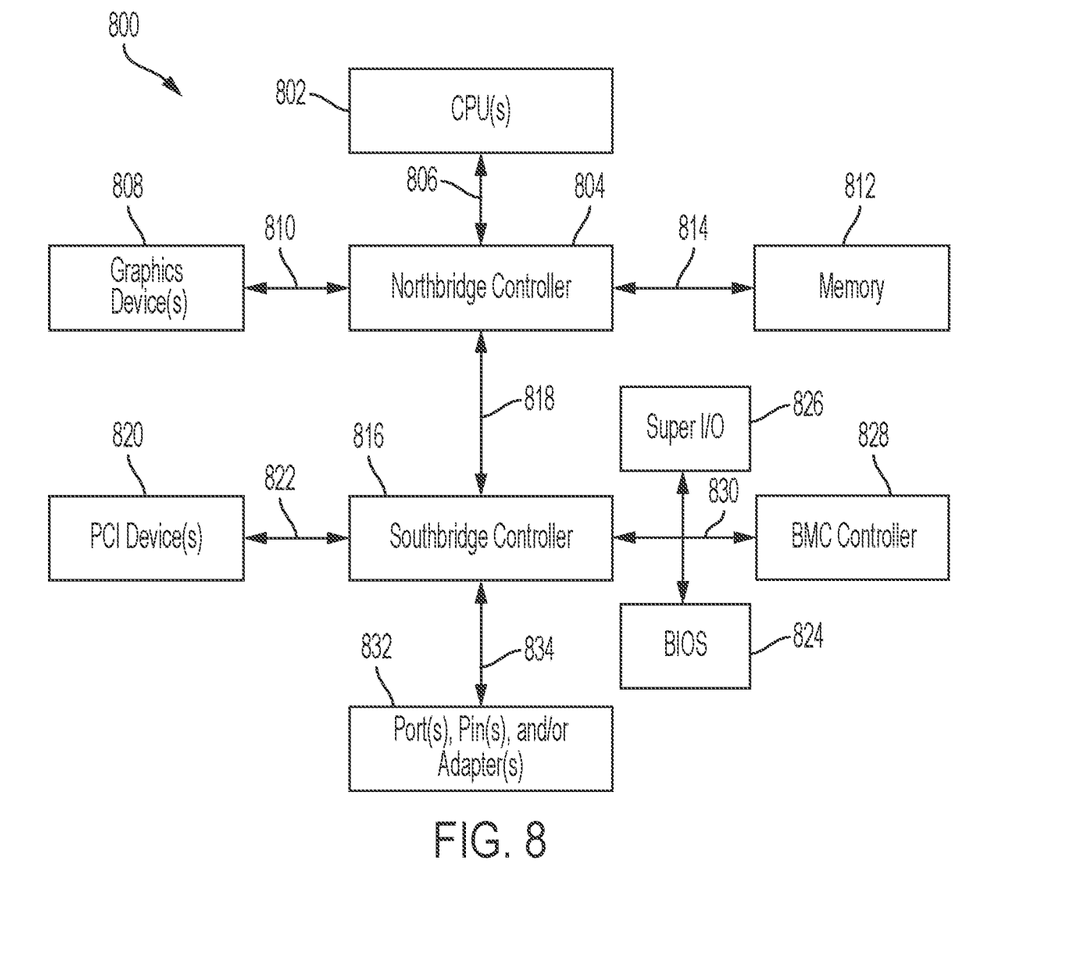
FIG. 8: Schematic of an information handling system according to an example of the present disclosure.

FIG. 8 is a block diagram of an information handling system according to some embodiments of the disclosure. An information handling system may include a variety of components to generate, process, display, manipulate, transmit, and receive information. One example of an information handling system 800 is shown in FIG. 8. Information handling system 800 may include one or more central processing units (CPUs) 802. In some embodiments, information handling system 800 may be a single-processor system with a single CPU 802, while in other embodiments information handling system 100 may be a multi-processor system including two or more CPUs 802 (e.g., two, four, eight, or any other suitable number). CPU(s) 802 may include any processor capable of executing program instructions. For example, CPU(s) 802 may be processors capable of implementing any of a variety of instruction set architectures (ISAs), such as the x86, POWERPC®, ARM®, SPARC®, or MIPS® ISAs, or any other suitable ISA. In multi-processor systems, each of CPU(s) 802 may commonly, but not necessarily, implement the same ISA.

CPU(s) 802 may be coupled to northbridge controller or chipset 804 via front-side bus 806. The front-side bus 806 may include multiple data links arranged in a set or bus configuration. Northbridge controller 804 may be configured to coordinate I/O traffic between CPU(s) 802 and other components. For example, northbridge controller 804 may be coupled to graphics device(s) 808 (e.g., one or more video cards or adaptors, etc.) via graphics bus 810 (e.g., an Accelerated Graphics Port or AGP bus, a Peripheral Component Interconnect or PCI bus, etc.). Northbridge controller 804 may also be coupled to system memory 812 via memory bus 814. Memory 812 may be configured to store program instructions and/or data accessible by CPU(s) 802. In various embodiments, memory 812 may be implemented using any suitable memory technology, such as static RAM (SRAM), synchronous dynamic RAM (SDRAM), nonvolatile/Flash-type memory, or any other type of memory.

Northbridge controller 804 may be coupled to southbridge controller or chipset 816 via internal bus 818. Generally, southbridge controller 816 may be configured to handle various of information handling system 800's I/O operations, and it may provide interfaces such as, for instance, Universal Serial Bus (USB), audio, serial, parallel, Ethernet, etc., via port(s), pin(s), and/or adapter(s) 832 over bus 834. For example, southbridge controller 816 may be configured to allow data to be exchanged between information handling system 800 and other devices, such as other information handling systems attached to a network. In various embodiments, southbridge controller 816 may support communication via wired or wireless data networks, such as any via suitable type of Ethernet network, via telecommunications/telephony networks such as analog voice networks or digital fiber communications networks, via storage area networks such as Fiber Channel SANs, or via any other suitable type of network and/or protocol.

Southbridge controller 816 may also enable connection to one or more keyboards, keypads, touch screens, scanning devices, voice or optical recognition devices, or any other devices suitable for entering or retrieving data. Multiple I/O devices may be present in information handling system 800. In some embodiments, I/O devices may be separate from information handling system 800 and may interact with information handling system 800 through a wired or wireless connection. As shown, southbridge controller 816 may be further coupled to one or more PCI devices 820 (e.g., modems, network cards, sound cards, video cards, etc.) via PCI bus 822. Southbridge controller 816 may also be coupled to Basic I/O System (BIOS) 824, Super I/O Controller 826, and Baseboard Management Controller (BMC) 828 via Low Pin Count (LPC) bus 830.

Information handling system 800 may be configured to access different types of computer-accessible media separate from memory 812. Generally speaking, a computer-accessible medium may include any tangible, non-transitory storage media or memory media such as electronic, magnetic, or optical media, including a magnetic disk, a hard drive, a CD/DVD-ROM, and/or a Flash memory. Such mediums may be coupled to information handling system 800 through various interfaces, such as universal serial bus (USB) interfaces, via northbridge controller 804 and/or southbridge controller 816. Some such mediums may be coupled to the information handling system through a Super I/O Controller 826 combines interfaces for a variety of lower bandwidth or low data rate devices. Those devices may include, for example, floppy disks, parallel ports, keyboard and mouse and other user input devices, temperature sensors, and/or fan speed monitoring.

BIOS 824 may include non-volatile memory having program instructions stored thereon. The instructions stored on the BIOS 824 may be usable by CPU(s) 802 to initialize and test other hardware components. The BIOS 824 may further include instructions to load an Operating System (OS) for execution by CPU(s) 802 to provide a user interface for the information handling system 800, with such loading occurring during a pre-boot stage. In some embodiments, firmware execution facilitated by the BIOS 824 may include execution of program code that is compatible with the Unified Extensible Firmware Interface (UEFI) specification, although other types of firmware may be used.

BMC controller 828 may include non-volatile memory having program instructions stored thereon that are usable by CPU(s) 802 to enable remote management of information handling system 800. For example, BMC controller 828 may enable a user to discover, configure, and/or manage BMC controller 828. Further, the BMC controller 828 may allow a user to setup configuration options, resolve and administer hardware or software problems, etc. Additionally or alternatively, BMC controller 828 may include one or more firmware volumes, each volume having one or more firmware files used by the BIOS firmware interface to initialize and test components of information handling system 800.

One or more of the devices or components shown in FIG. 8 may be absent, or one or more other components may be added. Further, in some embodiments, components may be combined onto a shared circuit board and/or implemented as a single integrated circuit (IC) with a shared semiconductor substrate. For example, northbridge controller 804 may be combined with southbridge controller 816, and/or be at least partially incorporated into CPU(s) 802. Accordingly, systems and methods described herein may be implemented or executed with other computer system configurations. In some cases, various elements shown in FIG. 8 may be mounted on a motherboard and enclosed within a chassis of the information handling system 800.

EXAMPLES

The present disclosure will be described in greater detail by way of specific examples. The following examples are offered for illustrative purposes only and are not intended to limit the disclosure in any manner. Those of skill in the art will readily recognize a variety of noncritical parameters which can be changed or modified to yield essentially the same results.

Example 1

Keyboard Containing a Bottom Cover Made of PLA and PCR

A keyboard including a top cover, a keycap assembly, and a bottom cover can be made. The top cover can be provided in laminate form, where the laminate layers can include recycled, recyclable, and/or biodegradable materials. The top cover laminate can include a layer of a polyester and a layer of a plurality of jute fibers, and the layers can be joined using a recyclable and/or biodegradable adhesive. The top cover can include one or more openings configured to allow keycaps to protrude through the one or more openings. The bottom cover can also be provided in laminate form, where the laminate layers can include recycled, recyclable, and/or biodegradable materials. The bottom cover laminate can include a layer of a polylactic acid and a layer of a plurality of jute fibers, and the layers can be joined using a recyclable and/or biodegradable adhesive. The top and bottom covers can be sealed, with the keycap assembly positioned between the top and bottom covers, using an ultrasonic bonding technique. The resulting keyboard includes top and bottom laminate layers that impart rigidity and strength to the keyboard.

Example 2

Keyboard Containing a Metallic Bottom Cover

A keyboard having a metallic bottom cover can be made. The keyboard can include a top cover, a keycap assembly, and a metallic bottom cover. The top cover can be provided in laminate form, where the laminate layers can include recycled, recyclable, and/or biodegradable materials. The top cover laminate can include a layer of a polyester and a layer of a plurality of jute fibers, and the layers can be joined using a recyclable and/or biodegradable adhesive. The top cover can include one or more openings configured to allow keycaps to protrude through the one or more openings. The metallic bottom cover can include magnesium, aluminum, and/or steel. At least a portion of each of the magnesium, aluminum, and/or steel in the bottom cover may be provided in recycled form. The top cover and metallic bottom cover can be sealed, with the keycap assembly positioned between the top and bottom covers, using an ultrasonic bonding technique. The resulting keyboard includes a top layer that can be made of recycled, recyclable, and/or biodegradable materials, and a recyclable bottom layer that can be made of recycled metallic materials.

Although embodiments of the present application and their advantages have been described in detail, it should be understood that various changes, substitutions and alterations can be made herein without departing from the spirit and scope of the embodiments as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the above disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A keyboard for an information handling system, comprising:
   a top cover comprising a polyester and a first plurality of jute fibers;
   a keycap assembly comprising one or more keycaps; and
   a bottom cover comprising a first polylactic acid (PLA) and a post-consumer resin (PCR), wherein the bottom cover comprises 60 wt. % to 10 wt. % of the first polylactic acid, 10 wt. % to 20 wt. % of the PCR, and a wt. balance of a second plurality of jute fibers,
   wherein the keycap assembly is positioned between the top cover and the bottom cover, and the top cover comprises one or more openings, with the one or more keycaps configured in the keycap assembly to protruding though the one or more openings of the top cover.

2. The keyboard of claim 1, wherein the top cover comprises a first laminate comprising a first layer comprising the polyester, and a second layer comprising a fabric layer comprising the first plurality of jute fibers.

3. The keyboard of claim 2, wherein the first layer and the second layer are attached to each other through a recyclable adhesive or a biodegradable adhesive.

4. The keyboard of claim 2, wherein the first layer of the first laminate of the top cover comprises from 30 wt. % to 100 wt. % virgin polyester material.

5. The keyboard of claim 2, wherein the first layer of the first laminate of the top cover comprises up to 70 wt. % post-consumer resin.

6. The keyboard of claim 1, wherein the polyester is a second polylactic acid (PLA).

7. The keyboard of claim 1, wherein the first plurality of jute fibers comprise at least one of cellulose, hemicellulose, pectin, or lignin.

8. The keyboard of claim 1, wherein the top cover has a renewable content ranging from 10 wt. % to 80 wt. % and/or recycled content ranging from 10 wt. % to 70 wt. %.

9. The keyboard of claim 1, wherein the bottom cover comprises a molded composition comprising the first PLA and the PCR.

10. The keyboard of claim 9, wherein the first PLA and the PCR constitute a third layer, and wherein the bottom cover further comprises a fourth layer.

11. The keyboard of claim 10, wherein the fourth layer comprises the second plurality of jute fibers.

12. The keyboard of claim 11, wherein the second plurality of jute fibers comprises at least one of cellulose, hemicellulose, pectin, or lignin.

13. The keyboard of claim 12, wherein the third layer and the fourth layer are coupled together by a second recyclable or biodegradable adhesive.

14. The keyboard of claim 1, wherein the PCR comprises at least one of PET, PBT, HIPS, ABS, or PC.

15. A keyboard for an information handling system, comprising:
   a top cover comprising a polyester and a plurality of jute fibers;
   a keycap assembly comprising one or more keycaps; and
   a bottom cover comprising a metallic composition comprising at least one 80 wt. % to 90 wt. % of magnesium (Mg), 5 wt. % to 10 wt. % of aluminum (Al), and 5 wt. % to 10 wt. % of steel.

16. The keyboard of claim 15, wherein the Mg in the bottom cover comprises at least a portion of recycled Mg equal to or greater than 80% of Mg in the bottom cover.

17. The keyboard of claim 15, wherein the Al in the bottom cover comprises at least a portion of recycled Al equal to or greater than 80% of Al in the bottom cover.

18. The keyboard of claim 15, wherein the steel in the bottom cover comprises at least a portion of recycled steel equal to or greater than 80% of steel in the bottom cover.

* * * * *